March 18, 1958   J. M. CHOHAMIN   2,826,865
SEED CARRIER UNIT
Filed Aug. 31, 1956
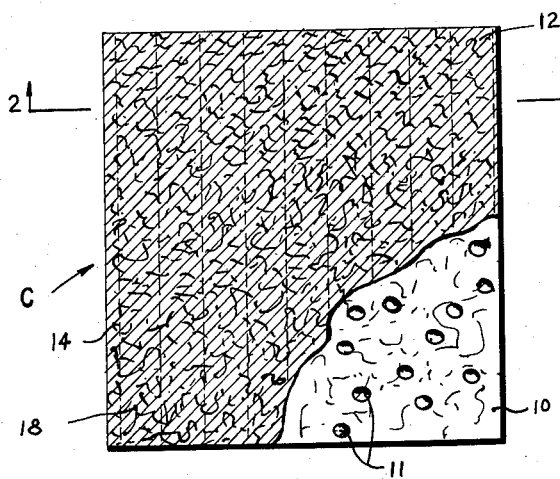
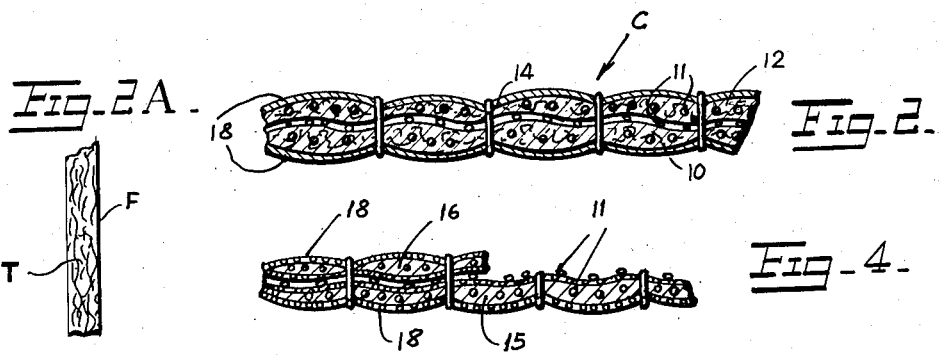
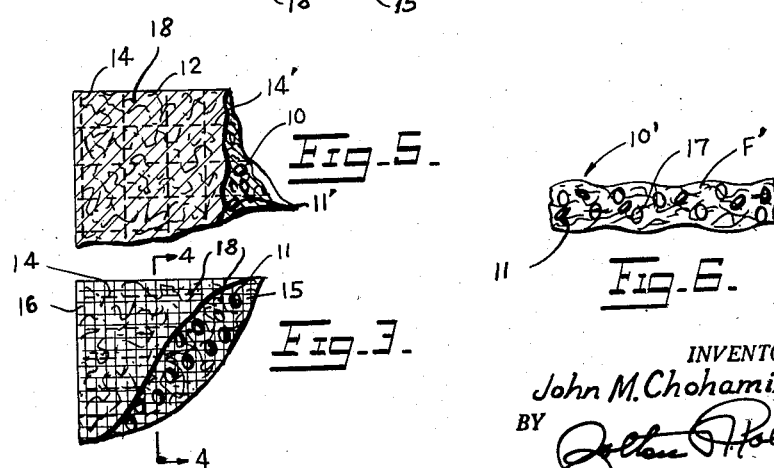
INVENTOR.
John M. Chohamin
BY
ATTORNEY.

United States Patent Office 2,826,865
Patented Mar. 18, 1958

2,826,865
SEED CARRIER UNIT
John M. Chohamin, Old Bridge, N. J.
Application August 31, 1956, Serial No. 607,467
12 Claims. (Cl. 47—56)

This invention relates to the art of seed carriers, and particularly concerns a seed wrapper having a laminated structure including a plurality of fibrous material layers.

It is a principal object to provide a seed carrier having a laminated structure with a plurality of cotton layers in and between which layers plant seeds are disposed in a scattered array, the several layers being secured together by stitching, and consisting of carded or combed fibers in shredded or flocculent array.

It is a further object to provide a seed carrier having a laminated structure, with each layer composed of heterogeneously arranged natural cellulosic or synthetic fibers, the several layers being sewn together with loosely twisted thread.

It is a further object to provide a seed carrier having a laminated structure, with a plurality of layers each composed of porous cloth, the cloth being woven or felted with long or short fibers so that the structure disintegrates in the soil to release plant seeds scattered between the layers, the several layers being secured together by lines of stitching sewn with a thread composed of the same material as the material of the cloth.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of a seed carrier embodying the invention with a portion of an upper layer broken away to show the disposition of seeds thereon.

Fig. 2 is a sectional view taken on lines 2—2 of Fig. 1.

Fig. 2A is an enlarged view of a fibrous yarn used in the seed carrier.

Fig. 3 is a fragmentary plan view of a seed carrier embodying a modification of the invention.

Fig. 4 is a sectional view taken on lines 4—4 of Fig. 3.

Fig. 5 is a fragmentary plan view of a further modification of the invention.

Fig. 6 is a sectional view of a portion of a mat of unwoven cloth usable in a seed carrier.

In Figs. 1 and 2 is shown a seed carrier C according to the invention having a laminated structure consisting of a first layer or mat 10 of short staple fibers. The fibers are generally free of tangles and knots such as is accomplished in conventional carding or combing processes in which fibers of various lengths are collected and formed into loose mats or sheets. On and in the mat 10 is distributed in a scattered array a plurality of seeds 11. The sizes of the seeds should be such that they are retained on the porous mat and do not fall through the pores or interstices between the fibers. Another mat 12 overlies the mat 10. Seeds 11 are also distributed within this mat. This mat 12 is a second layer of the seed carrier structure and is also composed of carded fibers like mat 10 disposed in flocculent array. The fibers are preferably cellulosic which are generally insoluble such as cotton. Thus, the mats have a rather high dry strength and a considerable wet strength, but are not weather resistant so that when planted on or in the ground the weathering disintegrates the mats in time and releases the seeds 11. The fibrous material takes up and holds a considerable quantity of water so that germination of the seeds 11 can take place.

The seeds are scattered within the individual mats and between the mats and are retained in rather fixed positions due to the interlocking of the fibers of the juxtaposed mats. The mats are bound together by machine stitching or sewing. A plurality of spaced lines of stitching 14 are employed. The lines of stitching define elongated porous fibrous compartments in which the seeds are embedded. The stitches are made with yarn composed of twisted or untwisted staple fibers of the same material as that of the mats 10, 12. This insures that the stitches 14 will weather and disintegrate at substantially the same rate as the mats. Yarn T shown in Fig. 2A is composed of untwisted fibers F and may be used in sewing stitches 14. The seed carrier may be covered on he outer sides with thin porous layers 18 made of paper or gauze bound to the mats by stitching 14.

In Figs. 3 and 4, the superimposed mats 15 and 16 consist of cloth or fabric woven of loosely twisted short staple fibers of natural cellulosics such as cotton or wood pulp, or synthetic cellulosics such as rayon. The several crossed strands thus have interlocking heterogeneously disposed fibers providing ample porosity for air and capillarity for moisture penetration to the embedded seeds 11. Stitching 14 secures the mats together as in Figs. 1 and 2. Porous layers 18 are shown formed of square knit gauze or netting disposed on both sides of each mat.

In Fig. 5, crossed spaced lines of stitching 14, 14' are used to secure the mats 10, 12 together. The crossed stitching lines in effect define rectangular porous fibrous walled compartments which are best adapted for retaining larger seeds, such as one or more seeds 11' of predetermined number per compartment.

The degree of unidirectional orientation of the fibers will depend on the length of time it is desired that the seed carriers resist disintegration by weathering, by chemical action of soil acids, by abrasion, etc. This time is governed by the natural germiniation periods of the seeds and other factors. In general the carded and flocculent fibers which have a general unidirectional orientation and are not twisted in strands, but do have some natural curl so as to interlock into a porous mass, will disintegrate fairly rapidly. The interwoven fabric mat layers particularly if cross-stitched as shown in Fig. 5, will resist disintegration for longer periods.

Mats 10 and 12 may be made of long staple fibers formed into unwoven cloth may also be used according to the invention. Fig. 6 shows such long fibers F' formed into a mat 10' with seeds 11 distributed therein. The fibers are locked together by spots of adhesive material 17. The adhesive material is preferably made of a water soluble material such as sodium or ammonium alginate, methyl cellulose or the like. The adhesive imparts high dry strength to the cloth. When the mat is placed on the ground the soil moisture will readily dissolve the adhesive bonds between the fibers without causing disintegration of the mats due to their interlocked long staple fiber structure. Untwisted yarn made of long staple fiber will be used to stitch the long staple fibrous mats together. After a time the fibrous mats will disintegrate and the germinating seeds will be released.

Seed carriers made as described above may be made to have a relatively long-time resistance to disintegration. Such carriers may be made with loose fibrous mats which have rather large pores. These mats will permit downward growth of roots and upward growth of stems as the seeds germinate. The desired plant growth will take place through the mats which will serve the desired functions of retaining soil moisture inhibiting growth of weeds, reducing soil movement or erosion, and protecting the young growing plants from wind-borne insects, excessive sunlight, wind, etc.

Seed carriers as disclosed herein may be provided with predetermined seed densities, that is the number of seeds distributed per cubic inch of mat coverage may be quite accurately controlled. This not only effects an economy in seed usage but also reduces subsequent thinning and pruning of the growing plants.

The seed carriers described may be economically manufactured by high speed mass production machinery which flocks the fibers into mats with seeds distributed therein, scatters seeds 11 on one mat 10, superimposes mat 12, adds porous covers 18, and then binds the mats with stitches 14.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A seed carrier, comprising a pair of carded, flocculent fiber superimposed mats, a plurality of seeds scattered in a predetermined density of distribution in the mats, a pair of porous covers on the outer sides of the mats, and a plurality of spaced lines of stitching binding the mats and covers together.

2. A seed carrier, comprising a first mat, said mat being composed of carded, flocculent fibers disposed in a general unidirectional arrangement, said fibers having natural curls so that the fibers interlock into a porous sheet, a plurality of seeds distributed in a predetermined density per volume in the mat, a second porous fibrous mat superimposed on the first mat, another plurality of seeds distributed in the second mat, said first and second mats being sewn together by loosely twisted yarn composed of fibers of the same material as the fibers of the mats, and a plurality of fabric covers disposed on respective sides of said mats and held there by said sewn yarn.

3. A seed carrier, comprising a pair of mats, said mats being composed of heterogeneously arranged water-insoluble fibers, a plurality of seeds distributed in a predetermined density in the mats, and a gauze cover on the outer side of each of the mats, said mats being sewn together by loosely twisted yarn composed of heterogeneously arranged water-insoluble fibers of the same material as the fibers of the mats.

4. A seed carrier, comprising a pair of carded cellulosic short staple fiber mats, a plurality of seeds scattered in a predetermined density of distribution in and between the mats, a fabric cover disposed on each side of each of the mats, and a plurality of spaced lines of stitching binding the mats and covers together, said stitching being composed of short staple loosely twisted cellulosic fiber yarn.

5. A seed carrier, comprising a first mat, said mat being composed of long staple water-insoluble fibers disposed in a general unidirectional arrangement, spots of water-soluble adhesive interlocking the fibers into a porous sheet, a plurality of seeds distributed in a predetermined density per unit volume in the mat, a second porous long staple fibrous mat superimposed on the first mat, a plurality of seeds distributed in the second mat, said first and second mats being sewn together by loosely twisted yarn composed of fibers of the same material as the fibers of the mats, and a plurality of seeds distributed between the mats.

6. A seed carrier, comprising a first cloth mat, said mat being composed of interwoven strands of heterogeneously arranged water-insoluble fibers, a plurality of seeds distributed in a predetermined density per unit volume in the mat, a second cloth mat composed of interwoven strands of heterogeneously arranged water-insoluble fibers superimposed on the first mat, a plurality of seeds distributed in the second mat, said first and second mats being sewn together by loosely twisted yarn composed of heterogeneously arranged water-insoluble fibers of the same material as the fibers of the mats.

7. A seed carrier, comprising a pair of carded fiber mats, a plurality of seeds scattered in a predetermined density of distribution in and between the mats, a gauze cover on at least one side of each mat, a plurality of spaced straight lines of stitching binding the mats and covers together, another plurality of spaced straight lines of stitching crossing the first mentioned lines to define fibrous compartments for said seeds.

8. A seed carrier, comprising a first mat, said mat being composed of carded synthetic short staple fibers disposed in a general unidirectional arrangement, said fibers having natural curls so that the fibers interlock into a porous sheet, a plurality of seeds distributed in a predetermined density in and over the mat, and a second mat composed of carded synthetic fibers superimposed on the first mat, said first and second mats being sewn together by loosely twisted yarn composed of synthetic short staple fibers of the same material as the fibers of the mats, said yarn being sewn as spaced straight lines of stitching defining elongated fibrous compartments for said seeds.

9. A seed carrier, comprising a first mat, said mat being composed of heterogeneously arranged long staple cellulosic fibers, a plurality of seeds distributed in a predetermined density in the mat, a second mat composed of heterogeneously arranged long staple cellulosic fibers superimposed on the first mat, a plurality of seeds distributed in the second mat, said first and second mats being sewn together by loosely twisted yarn composed of heterogeneously arranged cellulosic fibers of the same material as the fibers of the mats, the fibers in each of the mats being interlocked by spots of water-soluble adhesive material.

10. A seed carrier, comprising a pair of mats of woven cloth composed of carded fibers, a plurality of seeds scattered in a predetermined density of distribution in and between the mats, a gauze cover disposed on at least one side of each mat, a first plurality of spaced lines of stitching binding the mats together, and a second plurality of spaced lines of stitching crossing the first mentioned lines and defining generally rectangular porous fibrous compartments for a predetermined number of said seeds.

11. A seed carrier, comprising a first synthetic fiber mat, said mat being composed of short staple carded fibers disposed in a general unidirectional arrangement, said fibers having natural curls so that the fibers interlock into a porous sheet, a plurality of seeds distributed in a predetermined density per unit volume in and over the mat, and a second mat composed of short staple synthetic fibers superimposed on the first mat, said first and second mats being sewn together by loosely twisted yarn composed of fibers of the same short staple synthetic fibrous material as the fibers of the mats.

12. A seed carrier, comprising a first porous mat, said mat being composed of heterogeneously arranged loosely interlocking cotton fibers, a plurality of plant seeds distributed in a predetermined density per unit volume in and over the mat, and a second mat composed of heterogeneously arranged loosely interlocking cotton fibers superimposed on the first mat, said first and second mats being sewn together by loosely twisted cotton yarn composed of heterogeneously arranged fibers.

References Cited in the file of this patent

UNITED STATES PATENTS

| | | |
|---|---|---|
| 1,971,504 | Pratt | Aug. 28, 1934 |
| 2,192,939 | Slayter et al. | Mar. 12, 1940 |
| 2,309,702 | Kirschenbaum | Feb. 2, 1943 |
| 2,601,620 | Marshall | June 24, 1952 |